US012755983B2

(12) United States Patent
Huang et al.

(10) Patent No.: US 12,755,983 B2
(45) Date of Patent: Oct. 6, 2026

(54) DIRECT-FORMATION SELF-ASSEMBLY GRAPHENE FROM CELLULOSE NANOFIBER AQUEOUS SOLUTION

(71) Applicant: Nano and Advanced Materials Institute Limited, Hong Kong (HK)

(72) Inventors: Wei Huang, Hong Kong (HK); Soon Yee Liew, Hong Kong (HK); Shengbo Lu, Hong Kong (HK); Chenmin Liu, Hong Kong (HK)

(73) Assignee: HONG KONG APPLIED SCIENCE AND TECHNOLOGY RESEARCH INSTITUTE COMPANY LIMITED, Hong Kong (HK)

( * ) Notice: Subject to any disclaimer, the term of this patent is extended or adjusted under 35 U.S.C. 154(b) by 542 days.

(21) Appl. No.: 18/463,319

(22) Filed: Sep. 8, 2023

(65) Prior Publication Data

US 2024/0088397 A1 Mar. 14, 2024

Related U.S. Application Data

(60) Provisional application No. 63/404,610, filed on Sep. 8, 2022.

(51) Int. Cl.
*H01M 4/66* (2006.01)
*H01M 4/02* (2006.01)
(Continued)

(52) U.S. Cl.
CPC ......... *H01M 4/663* (2013.01); *H01M 4/0409* (2013.01); *H01M 4/045* (2013.01);
(Continued)

(58) Field of Classification Search
None
See application file for complete search history.

(56) References Cited

U.S. PATENT DOCUMENTS

2011/0183180 A1* 7/2011 Yu .......................... H01G 11/46 977/734
2014/0203219 A1* 7/2014 Nishijima ............... C08B 15/04 252/510

(Continued)

FOREIGN PATENT DOCUMENTS

CN 104910398 A * 9/2015
CN 103966907 B * 8/2016

(Continued)

OTHER PUBLICATIONS

CN107915853A—machine translation (Year: 2018).*

(Continued)

*Primary Examiner* — Haroon S. Sheikh
(74) *Attorney, Agent, or Firm* — IDEA Intellectual Limited; Sam T. Yip

(57) ABSTRACT

A self-assembled freestanding graphene membrane or graphene layer is formed from industrial graphene having a particle size from approximately 1 to 10 microns and cellulose nanofibers having a nanofiber size from approximately 1 to 9 microns. The self-assembled freestanding graphene membrane or graphene layer has a graphene to cellulose nanofiber mass ratio of approximately 12:1 to 20:1, an electrical conductivity of between approximately 5.8 and 7.2 S/cm, and a thermal conductivity of between 2000 and 3000 W $m^{-1}$ $K^{-1}$. The freestanding graphene membrane or graphene layer is formed from an aqueous dispersion of graphene and cellulose nanofibers in a mass ratio of graphene to cellulose nanofibers of 20:1 to 10:1 deposited on a substrate followed by self-assembly and drying. A dopant of oxygen, nitrogen, sulfur, nickel, gold, silver, zinc, copper, magnesium, and boron may be precisely incorporated into the graphene membrane or layer.

13 Claims, 5 Drawing Sheets

(51) Int. Cl.
*H01M 4/04* (2006.01)
*H01M 4/80* (2006.01)
*H01M 10/052* (2010.01)
*H01M 50/105* (2021.01)

(52) U.S. Cl.
CPC ........... *H01M 4/0471* (2013.01); *H01M 4/80* (2013.01); *H01M 10/052* (2013.01); *H01M 50/105* (2021.01); *H01M 2004/021* (2013.01); *H01M 2004/027* (2013.01)

(56) References Cited

U.S. PATENT DOCUMENTS

| | | | | |
|---|---|---|---|---|
| 2014/0248537 | A1* | 9/2014 | Hayashi | H01M 4/485 536/56 |
| 2014/0255782 | A1* | 9/2014 | Jabbour | H01M 4/131 429/217 |
| 2016/0126554 | A1* | 5/2016 | Beneventi | H01M 4/625 29/623.5 |
| 2017/0346059 | A1* | 11/2017 | Kunnari | C08L 1/02 |
| 2018/0108941 | A1* | 4/2018 | Lee | H01M 4/13 |
| 2018/0205114 | A1* | 7/2018 | Pauric | H01M 4/80 |
| 2018/0304210 | A1* | 10/2018 | Galembeck | C09D 5/32 |
| 2020/0083542 | A1* | 3/2020 | Yushin | H01M 4/8828 |

FOREIGN PATENT DOCUMENTS

| | | | | | |
|---|---|---|---|---|---|
| CN | 107293377 | A | * | 10/2017 | H01B 13/00 |
| CN | 107915853 | A | * | 4/2018 | C08J 5/18 |
| CN | 107915853 | Å | | 4/2018 | |
| CN | 110010852 | A | * | 7/2019 | H01M 10/0525 |
| CN | 111646459 | A | | 9/2020 | |
| CN | 113652885 | A | | 11/2021 | |
| CN | 113906592 | A | * | 1/2022 | H01M 4/626 |
| CN | 115360353 | A | * | 11/2022 | H01M 4/622 |
| WO | WO-2013076372 | A1 | * | 5/2013 | C01B 32/21 |
| WO | 2017197205 | A1 | | 11/2017 | |

OTHER PUBLICATIONS

Zhang. “Fabrication of cellulose/graphene paper as a stable-cycling anode materials without collector” (Year: 2018).*

Weng. “Graphene-Cellulose Paper Flexible Supercapacitors.” (Year: 2011).*

Du. “Nanocellulose electroconductive composites.” (Year: 2013).*

Patel. “Low surface area graphene/cellulose composite as a host matrix for lithium sulphur batteries.” (Year: 2014).*

Kang. “abrication of electric papers of graphene nanosheet shelled cellulose fibres by dispersion and infiltration as flexible electrodes for energy storage” (Year: 2012).*

Ouyang. “Scalable preparation of three-dimensional porous structures of reduced graphene oxide/cellulose composites and their application in supercapacitors.” (Year: 2013).*

Shi. “Nanocellulose electroconductive composites.” (Year: 2013).*

MSE PRO. https://www.msesupplies.com/products/mse-pro-1g-high-specific-surface-area-800-m2-g-graphene-powder-for-lithium-ion-batteries (Year: 2026).*

Yang. “Completely Green Approach for the Preparation of Strong and Highly Conductive Graphene Composite Film by Using Nanocellulose as Dispersing Agent and Mechanical Compression.” (Year: 2017).*

Cellulose Nanofiber (CNF) Research Laboratory, “Cellulose nanofiber manufacturing technology and application development”, Nippon Paper Industries Co., Ltd. URL: https://www.nipponpapergroup.com/english/research/organize/cnf.html downloaded on Sep. 12, 2023.

1st Office Action of the corresponding China patent application No. 202311157679.0 mailed on Feb. 26, 2025.

* cited by examiner (C)

DIRECT-FORMATION SELF-ASSEMBLY GRAPHENE FROM CELLULOSE NANOFIBER AQUEOUS SOLUTION

CROSS-REFERENCE TO RELATED APPLICATION

This application claims priority to U.S. Provisional Patent Application No. 63/404,610, filed 8 Sep. 2022, the disclosure of which is incorporated by reference herein.

FIELD OF THE INVENTION

The present disclosure relates to the direct-formation of a self-assembly graphene structure based on a cellulose nanofiber aqueous solution.

BACKGROUND

With the increasing demand for high-energy-density rechargeable batteries, alternatives to lithium-ion batteries are being explored. As one of these alternatives, lithium metal batteries are being investigated for several reasons:

Higher Energy Density: Lithium metal has a higher theoretical specific capacity compared to the graphite-based anodes used in lithium-ion batteries. As a result, a higher energy density, compact battery can be formed.

Reduced Volume and Weight: Due to their higher specific capacity (Lithium metal has a specific capacity of 3860 mAh $g^{-1}$), lithium metal batteries can be smaller and lighter for a given amount of energy storage which is important for electrical vehicles and other portable applications.

Faster Charging: Lithium metal batteries are faster charging and higher power output due to the lower resistance of lithium metal compared to graphite.

Cost Reduction: As a result of the above features, lithium metal batteries may demonstrate a lower energy storage per unit cost, lowering the price of large applications such as electric vehicles.

However, lithium metal batteries face challenges to implementation such as dendrite formation. Dendrites are needle-like structures that can form during the charging process and pierce the separator between the electrodes. Dendrite formation leads to safety hazards such as short-circuiting, causing fires. Additionally, there is a large volume change during charging/discharging.

As a result of these challenges, graphene materials are being explored as a substrate for lithium metal anodes in lithium metal batteries. Graphene materials are based on single layers of carbon atoms in a hexagonal lattice microstructure. The layers include many double bonds and exhibit neighbor-to-neighbor bonding similar to carbon nanotubes. The structure of the valence and conduction band make graphene a semimetal with useful and unusual electronic properties and a high tensile strength.

Graphene-based materials can be employed in various ways to mitigate these challenges:

Scaffold for Electrolytic Deposition: Graphene can serve as a scaffold or template for the uniform deposition of lithium metal during charging. By using graphene as a substrate, lithium metal can be deposited in a more controlled manner, reducing the formation of dendrites and enhancing the stability of the anode. This approach can help create a more stable and safer lithium metal battery.

Enhanced Conductivity and Mechanical Support: Graphene is an excellent electronic conductor and possesses exceptional mechanical strength. Incorporating graphene into the anode can improve the overall conductivity of the electrode, enabling faster charge and discharge rates.

Additionally, the mechanical stability of the graphene-based anode can help accommodate the volume changes that occur during the lithiation and delithiation processes.

Improved Interface and Ionic Transport: Graphene-based materials can also enhance the interface between the lithium metal anode and the electrolyte, improving the efficiency of ion transport. This can contribute to reduced internal resistance and better overall battery performance.

Stress Reduction: The flexibility and elasticity of graphene can help accommodate the strain that occurs during cycling, minimizing the chances of electrode cracking and improving the cycle life of the battery.

However, the production of graphene-based anode materials has been limited due to the difficulty of graphene material fabrication. Typically, graphene has been produced from the reduction of graphene oxide materials. The reduction process may use reducing agents such as hydrazine, a chemical which is both flammable and toxic. Further, production of graphene sheets from reduced graphene oxide limits the flexibility of the surface chemistry of the graphene sheets. Therefore this process is not conducive to large-scale commercial production.

Due to the low intra-molecular interaction of graphene nanosheets, there is low dispersion of pure graphene in solvents, thus the development of graphene typically starts from the reduced graphene oxide (rGO) which relies upon the hydrogen bonding between the nanosheets as well as good dispersion in the solvent.

In addition to battery applications, graphene is a promising material due to its unusual mechanical, electrical, chemical, and optical properties. The economical fabrication of high-quality graphene sheets permits the application of graphene materials in a wide variety of non-battery uses where cost has limited their previous use. These include solar cells, light-emitting diodes (LED), integrated photonic circuit devices, touch panels, supercapacitors, and smart windows.

Thus, there is a need in the art for a technique for low-temperature, direct fabrication of graphene layers and freestanding sheets/membranes. The present invention addresses this need.

SUMMARY OF THE INVENTION

The present invention provides a self-assembled freestanding graphene membrane or graphene layer formed from industrial graphene having a particle size from approximately 1 to approximately 10 micron and cellulose nanofibers having a nanofiber size from approximately 1-9 microns. The self-assembled freestanding graphene membrane or graphene layer has a graphene to cellulose nanofiber mass ratio of approximately 12:1 to 20:1 and an electrical conductivity of between approximately 5.8 and 7.2 S/cm and a thermal conductivity of between approximately 2000 and 3000 W $m^{-1}$ $K^{-1}$. The freestanding graphene membrane or graphene layer is formed from an aqueous dispersion of the graphene and the cellulose nanofibers in a mass ratio of graphene to cellulose nanofibers of 20:1 to 10:1 deposited on a substrate followed by self-assembly and drying.

The self-assembled freestanding graphene membrane or graphene layer may further include a dopant including one or more of oxygen, nitrogen, sulfur, nickel, gold, silver, zinc, copper, magnesium, and boron.

The self-assembled freestanding graphene membrane or graphene layer may include by adding the dopant from a doped graphene particle to the aqueous dispersion.

A lithium metal anode may be formed from the self-assembled freestanding graphene membrane or graphene layer with an electroplated layer of lithium having a capacity of 4 mAh $cm^{-2}$ to 10 mAh $cm^{-2}$ formed thereon.

A battery may be formed including the lithium metal anode made from the self-assembled freestanding graphene membrane or graphene layer with an electroplated layer of lithium formed thereon. The battery may be a lithium pouch battery.

The invention further relates to a method of forming a self-assembled freestanding graphene-cellulose nanofiber membrane or layer. An aqueous dispersion of graphene particles having a particle size of approximately 1 micron to approximately 9 microns is formed with cellulose nanofibers having a nanofiber length of approximately 1 to approximately 9 microns at a mixing ratio of graphene particles and the cellulose nanofibers of approximately 20:1 to approximately 10:1. The aqueous dispersion is mixed and deposited on a substrate. The dispersion is dried to form the self-assembled freestanding graphene-cellulose nanofiber membrane or layer.

The method may further include adding a dopant including one or more of oxygen, nitrogen, sulfur, nickel, gold, silver, zinc, copper, magnesium, and boron to the aqueous dispersion.

The dopant may be added in the form of adding a doped graphene particle to the aqueous dispersion.

The depositing may be by dispersion casting or doctor blade coating.

The deposited material may be subjected to rolling following drying.

The deposited material may be subjected to a low temperature thermal treatment at a temperature of approximately 50-70° C. for a period of approximately 6 hours to 24 hours.

A lithium metal layer may be further electroplated on the self-assembled freestanding graphene-cellulose nanofiber membrane or layer.

BRIEF DESCRIPTION OF THE DRAWINGS

FIG. 4A is a coin cell and FIG. 4B is a pouch battery.

DETAILED DESCRIPTION

Figure 1:
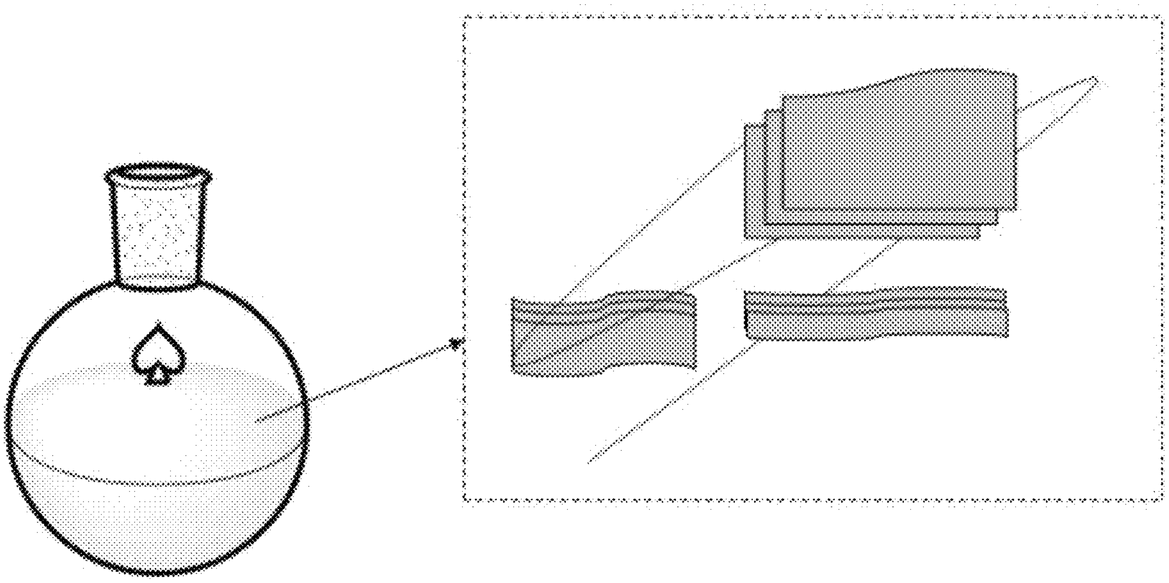
FIG. 1 schematically depicts of a graphene cellulose nanofiber solution in accordance with an embodiment.

The present invention addresses the formation of graphene from industrial grade graphene by improving the dispersibility of graphene in a fluid, enabling low-cost formation of graphene layers and sheets. As discussed above, it is currently difficult for forming graphene sheets or layers by dispersions due to low intra-molecular interaction of graphene nanosheets, resulting in low dispersion of pure graphene in solvents. Therefore, it is still an important challenge to improve pure graphene dispersion in solvents during the fabrication procedure to enable widespread applications and developments of graphene sheets and layers for electronic and optical devices.

As used herein, the term "industrial grade graphene" is used to describe particulate graphene that is pure graphene (not graphene oxide) and that may be purchased from a variety of vendors. By using commercially-available graphene particles, the present invention does not require conversion from graphene oxide in order to make graphene scaffolds.

Cellulose nanofibers (CNFs) are nanoscale-sized fibers derived from cellulose, which is the most abundant organic polymer on Earth and is primarily found in the cell walls of plants. CNFs are typically obtained through mechanical or chemical processes that break down cellulose fibers into smaller and finer structures, resulting in nanofibers with diameters typically ranging from a few nanometers to a few hundred nanometers, and lengths that can extend from micrometers to millimeters.

Key characteristics of cellulose nanofibers include:

Nanoscale Dimensions: CNFs are extremely small, with a high aspect ratio (length to diameter ratio), giving them a large surface area-to-volume ratio. This property makes them suitable for various applications.

Biodegradability: CNFs are derived from renewable and biodegradable sources, such as wood pulp, cotton, or agricultural residues. Their biodegradability makes them an environmentally friendly material.

High Strength: Despite their small size, CNFs are strong and lightweight, making them suitable for reinforcing materials.

High Surface Area: CNFs' large surface area are useful for interactions with other materials, such as polymers, nanoparticles, or chemicals.

Transparency: CNFs can be highly transparent, which is advantageous in applications where transparency or optical clarity is required, such as films or coatings.

Due to their high surface area and mechanical strength, cellulose nanofibers were selected as a binder for aqueous dispersions of graphene materials in the present invention. The cellulose nanofibers stabilize the aqueous dispersions of the industrial grade graphene starting materials. They help prevent sedimentation and agglomeration of the dispersed graphene particles, thus maintaining the stability of the dispersion. Further, the cellulose nanofibers form a stable network structure when dispersed in water. This network can be used to assist in forming thin films and layers from graphene/cellulose nanofiber dispersions onto substrates to form graphene layers or freestanding graphene sheets. Further, the viscosity of the dispersion can be regulated according to the amount of cellulose nanofibers added to the dispersion. This is important since different viscosities are required for different deposition techniques; for example, solution casting has a relatively low viscosity and uses a lower amount of cellulose nanofibers while doctor blade coating requires a higher viscosity slurry that uses a greater amount of cellulose nanofibers.

Using an aqueous dispersion of graphene particles and cellulose nanofibers, freestanding membranes or sheets may be formed as well as layers on substrates such as metal current collectors for batteries. Due to the binding effect of the cellulose nanofiber, large scale freestanding anodes for fabrication of lithium metal anodes for lithium metal batteries (e.g., single-layer pouch cells) may be formed.

In particular, the present invention provides a simple methodology for the fabrication of self-assembled membranes/sheets/layers of industrial-grade graphene, which can be used in various electronic applications such as the battery anode described above or anodes for supercapacitor or as conductive layers. As used herein, the term "self-assembled" relates to materials that organize themselves into specific structures at the nanoscale without the need for complex manufacturing processes. That is, self-assembled materials rely on the inherent properties of the constituent molecules or particles to organize themselves into the desired configuration. With respect to graphene, individual graphene layers from graphene particles may self-assemble into a single-layer graphene material.

The present invention determined that the ratio of graphene particles to the ratio of cellulose nanofibers in the dispersion should range from a mass ratio of 20:1 (graphene:cellulose) to 10:1 (graphene:cellulose). Although other materials such as stabilizers, dispersants, or viscosity controllers may also be added to the dispersion, it is preferable that fewer ingredients are added since the dispersion of the present invention may be processed with natural drying or low-temperature drying. That is, any additional materials are not removed during the optional low-temperature drying so the electrical properties are better preserved with fewer additives. However, it is understood that it is possible to use the dispersions of the present invention in a casting process followed by high-temperature decomposition of additives.

The flexibility of the host substrates fundamentally gives the possibility of direct post-processing and widespread applications of the self-assembly graphene structure. Compared with traditional reduced graphene oxide based self-assembly graphene structure, the simple methodology of the present invention can realize a high selectivity on the control of the surface chemistry as well as simplify the procedure of post-processing on the graphene structure.

A wide variety of particle sizes may be used in the aqueous dispersions of the present invention. The commercially-available, industrial grade graphene particles may have a diameter on the order of 1 micron to approximately 15 microns, with a thickness from 3 nm to 15 nm. The cellulose nanofibers may have a fiber diameter of approximately 4-10 nm and a fiber length of approximately 1 to approximately 9 microns.

Using the cellulose nanofiber as the binder, the liquid-based procedure facilitates aqueous fabrication that is green and low-cost compared with procedures using organic solvents. More importantly, the cellulose nanofiber can be used as the stabilizer for the dispersion of graphene which exhibits low intra-molecular interactions in water, enabling the fabrication of stable dispersion or slurry. With the stable graphene water dispersion, a free-standing self-assembly graphene membrane on a hydrophobic substrate as well as the coating on hydrophilic substrate can be formed, while retaining the electrical properties of graphene which can be further developed to specific devices.

FIG. 1 is a schematic depiction of a graphene-cellulose dispersion in which the graphene is stably dispersed in a 1 wt % aqueous dispersion of cellulose nanofibers. The introduction of cellulose nanofibers into a graphene aqueous dispersion can create a stable dispersion of graphene at a mass ratio from 20:1 (graphene:cellulose) to 10:1 (graphene:cellulose). For the introduction of functional structures into the composite graphene, specific functional additives are quantitatively controlled by ratio to the graphene component which provides a way to accurately control the surface chemistry of the composite graphene. Up to 200 mg/mL aqueous solutions may be prepared. Mixing of graphene and additives in the cellulose nanofiber solution is conducted. The materials may be mixed by a centrifugal impeller mixer to form a stable and homogeneous dispersion or slurry depending upon the desired viscosity of the material for a particular coating process.

Figure 2A:
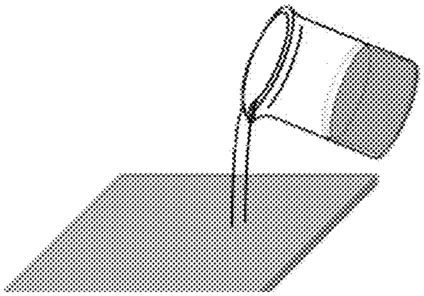
FIGS. 2A-2C schematically depict methods for forming free-standing graphene membranes or graphene layers according to an embodiment.
Figure 2B:
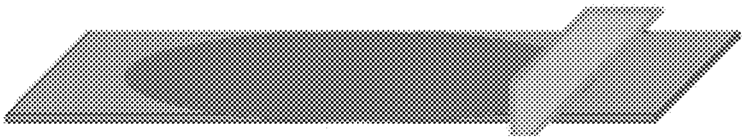
Figure 2C:
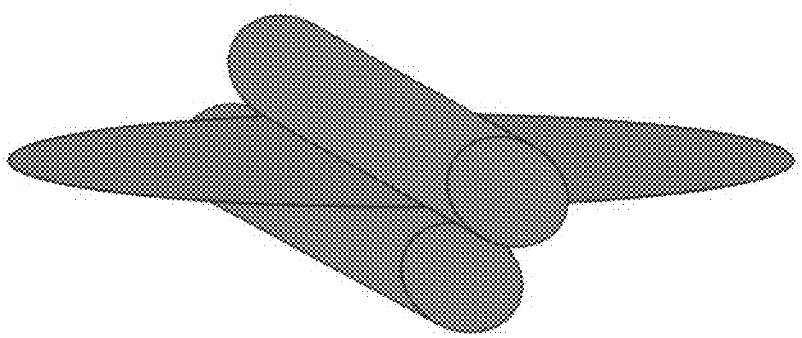

FIGS. 2A-2C schematically depict layer-forming techniques to create both free-standing graphene membranes and formation of graphene layers on substrates such as copper current collectors from the composite graphene:cellulose nanofiber dispersion of FIG. 1. The substrate for forming a freestanding graphene scaffold is a hydrophobic substrate which can provide a stable interface for self-assembly of graphene, as shown in FIG. 2A. Membrane thickness on the order of 50-200 microns may be formed.

In FIG. 2B, composite graphene:cellulose nanofiber dispersion is deposited by a doctor blade technique have a controllable thickness. Exemplary thicknesses for a graphene layer on a current collector are 10-150 microns. Both the freestanding membrane of FIG. 2A and the graphene doctor blade coating layer of FIG. 2B may be naturally dried under ambient conditions for approximately 6 hours to 24 hours for self-assembly of the graphene. After self-assembly of the graphene structure, a rolling process may be conducted on the membrane or the layer at a slightly elevated temperature on the order of 50 to 70° C. to increase the homogeneity of the graphene structure, as shown in FIG. 2C. Following rolling, the membrane or layer may be subjected to further low temperature heat treatment of 50 to 70° C. for a period of 6 hours to approximately 24 hours.

In another aspect, the techniques of the present invention further enable the precision doping of the graphene membranes/sheets/layers. Highly-accurate quantities of dopants may be added to control the ratio of pure graphene to doped-graphene. The simple but accurate regulation of surface chemistry of the graphene coatings or free-standing membranes enables the flexible modification of graphene membrane for various electrical applications.

For example, the graphene freestanding membranes or layers may be used as scaffolds for lithium metal deposition to create lithium anodes in lithium metal batteries. Typically, lithium nucleation and deposition are irregular on lithium metal anodes which results in dendrite formation. As discussed above, dendrite formation creates unsafe battery conditions since the continued growth of dendrites leads to short circuits and battery failure. Dendrite growth is caused, in large part, by the uneven nucleation and growth of lithium during the battery charging cycle. Therefore, lithium metal anodes should encourage uniform deposition of lithium by providing a uniform distribution of lithium nucleation sites on the anode. One way to accomplish this uniform lithium nucleation and growth is to use a doped graphene scaffold that provides lithiophilic sites for lithium nucleation and growth. Various dopant materials may be used. These include oxygen, nitrogen, sulfur, fluorine, nickel, gold, silver, zinc, copper, magnesium, and boron. These dopants or other dopants may also be used when the application of the graphene sheets/layers is for other electrical or optical applications, for example, supercapacitor electrodes.

In addition to encouraging uniform nucleation and growth of lithium during the charging cycle, the presence of dopants also encourages the uniform nucleation and growth of lithium during electroplating to form a lithium-metal plated graphene anode.

Therefore, in another aspect, the present invention provides a method for making a doped graphene sheet with a dopant that includes one or more of oxygen, nitrogen, sulfur, nickel, gold, silver, zinc, copper, magnesium, and boron. In this technique, the graphene provided in the aqueous dispersion may include graphene that already includes one or more of these dopants in the form of an element or compound. For example, the oxygen may be in the form of graphene oxide that is added to undoped graphene. Other doped graphene materials may be used as the raw material. Alternatively, elemental metals or compounds may be added to the dispersion. For example, zinc oxide, copper oxide, magnesium oxide, boron oxide or nitride, silver oxide, and/or nickel oxide. Metallic gold may be added. The remaining dispersion conditions are substantially similar to the dispersion of undoped graphene to form a graphene sheet or layer.

Compared to conventional traditional fabrication of graphene layers from reduced graphene oxide (rGO), the composite free-standing graphene membranes or layers made using graphene, dopants, and cellulose nanofibers of the present invention provide a much higher flexibility lower-cost fabrication procedure.

When the graphene sheets and layers of the present invention are used as electrodes in lithium metal batteries, a lithium electroplating process may be used to evenly coat the graphene scaffold with lithium metal.

The electroplating may be performed using the lithium metal foil (50 μm-500 μm) as a counter electrode at an electrodeposition potential to around 0 V to produce a lithium metal coating capacity on the order of 4 mAh $cm^{-2}$ to 10 mAh $cm^{-2}$. Other coating techniques may also be used to form the lithium metal coating on the graphene structures including the use of molten lithium to infiltrate the graphene structures, rolling the lithium metal into the graphene scaffold or thermal decomposition of lithium precursors on graphene.

Figure 4A:
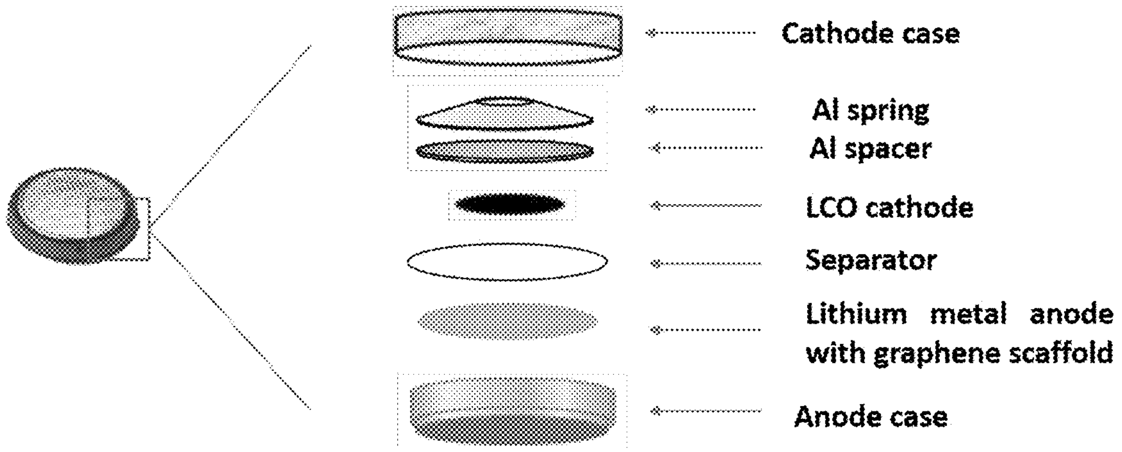
FIGS. 4A-4B depict batteries that use the anodes of the present invention.

The lithium graphene anodes of the present invention may be used in a wide variety of batteries. One type of battery is a coin cell as seen in FIG. 4A. As seen in FIG. 4A, the coin cell includes cathode and anode cases with an Al spring and spacer adjacent to the cathode case. A lithium cobalt oxide cathode is selected although it is understood that many lithium transition metal oxide cathode compositions may be selected. A separator separates the cathode from the lithium metal/graphene scaffold anode.

Figure 4B:
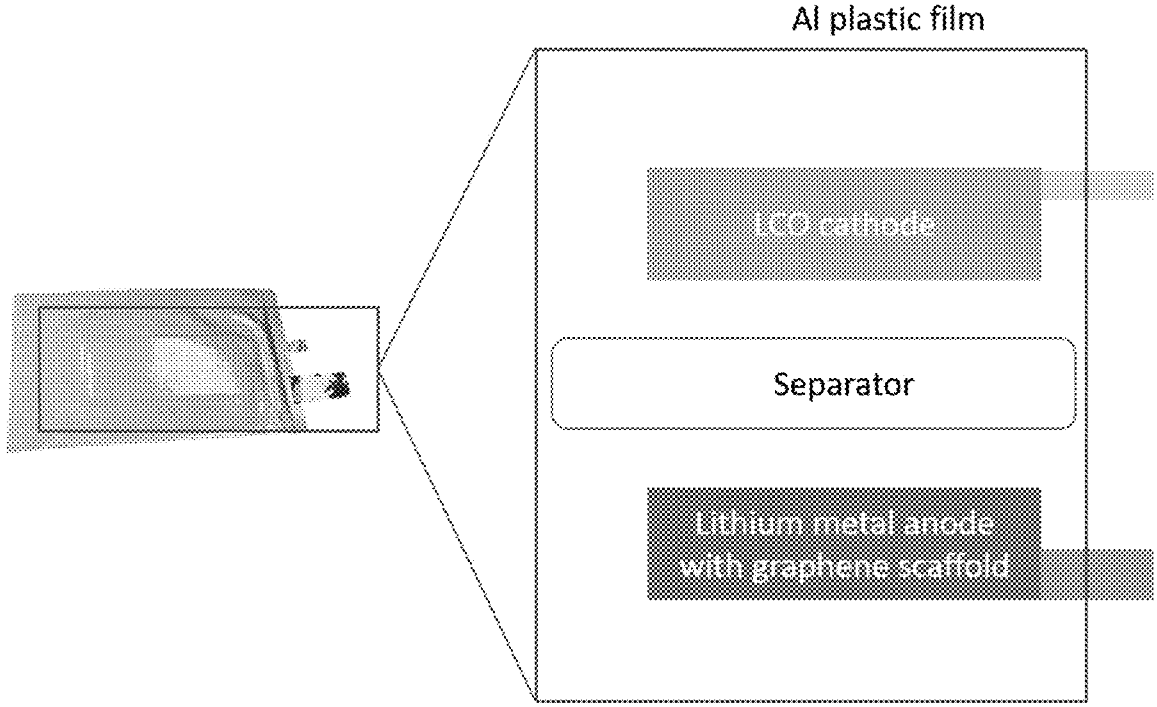

In FIG. 4B, a pouch battery is formed with a soft exterior pouch of an aluminum coated polymer film. A lithium cobalt oxide cathode/separator/lithium metal-graphene anode system is used. As with the cathode of the coin cell, a wide variety of lithium transition metal oxides may be used in the pouch battery of FIG. 4B.

Examples

An industrial grade source of pure graphene (1-10 microns) was sourced from XFNano Materials Tech Ltd (kg-level product). The raw material of cellulose nanofiber (1-3 um) from Guilin Qihong Technology Co., Ltd. The raw materials were mixed at a ratio of 20:1 graphene:cellulose nanofiber in an aqueous dispersion.

The properties of the graphene material are set forth in Table 1, below:

TABLE 1

| Graphene raw material properties | |
|---|---|
| Carbon content | >98 at % (EDS) |
| Ash content | <1 wt % |
| Lateral size | 1-10 μm HRTEM |
| Thickness | 3-9 nm HRTEM |
| Conductivity | 800-1100 S/cm |
| Moisture content | <2 wt % |
| Grain size | ~160.4 μm |
| Tap density | 0.04-0.07 g/$cm^3$ |
| Apparent density | 0.06-0.10 g/$cm^3$ |

The aqueous dispersion was cast onto a copper foil (8-25 m) and dried to permit self-assembly of the materials. The dried membrane was subject to rolling and thermal treatment at 70° C. for approximately 24 hours to further homogenize the membrane.

The membrane was used as a scaffold for the deposition of lithium metal by electrodeposition to form a lithium metal anode for a battery. 10 mAh $cm^{-2}$ of lithium metal is electroplated into the graphene scaffold, using an electrolyte of 1 M LiTFSI in DME/DOL (volume ratio: 6:4) with 0.8 M $LiNO_3$.

The lithium anode was incorporated into a lithium cobalt oxide/Lithium metal anode system with 3 M LiFSI in DME as an electrolyte with an electrochemical window 3-4.3 V.

Figure 3A:
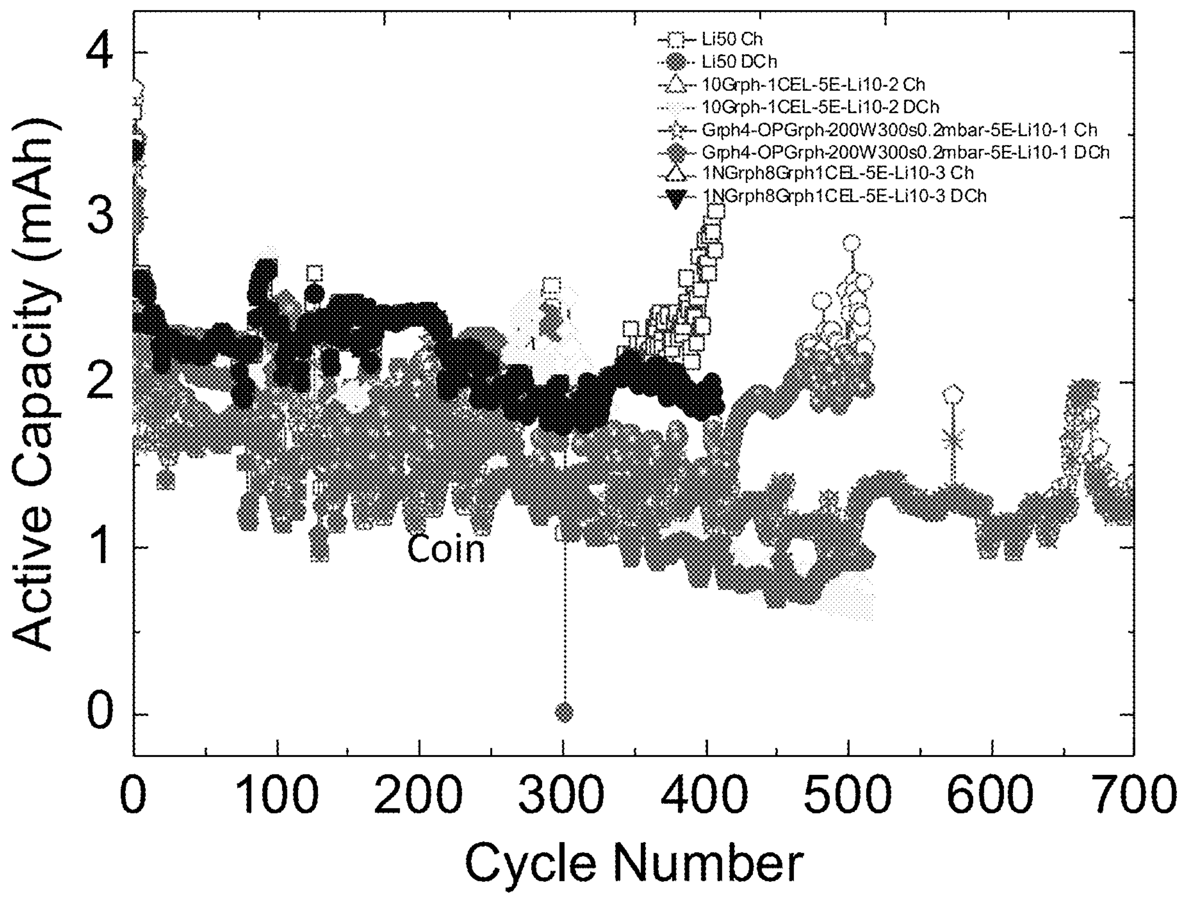
FIGS. 3A-3B depict lithium metal battery properties using anodes formed from the graphene materials coated with lithium metal according to an embodiment.
Figure 3B:
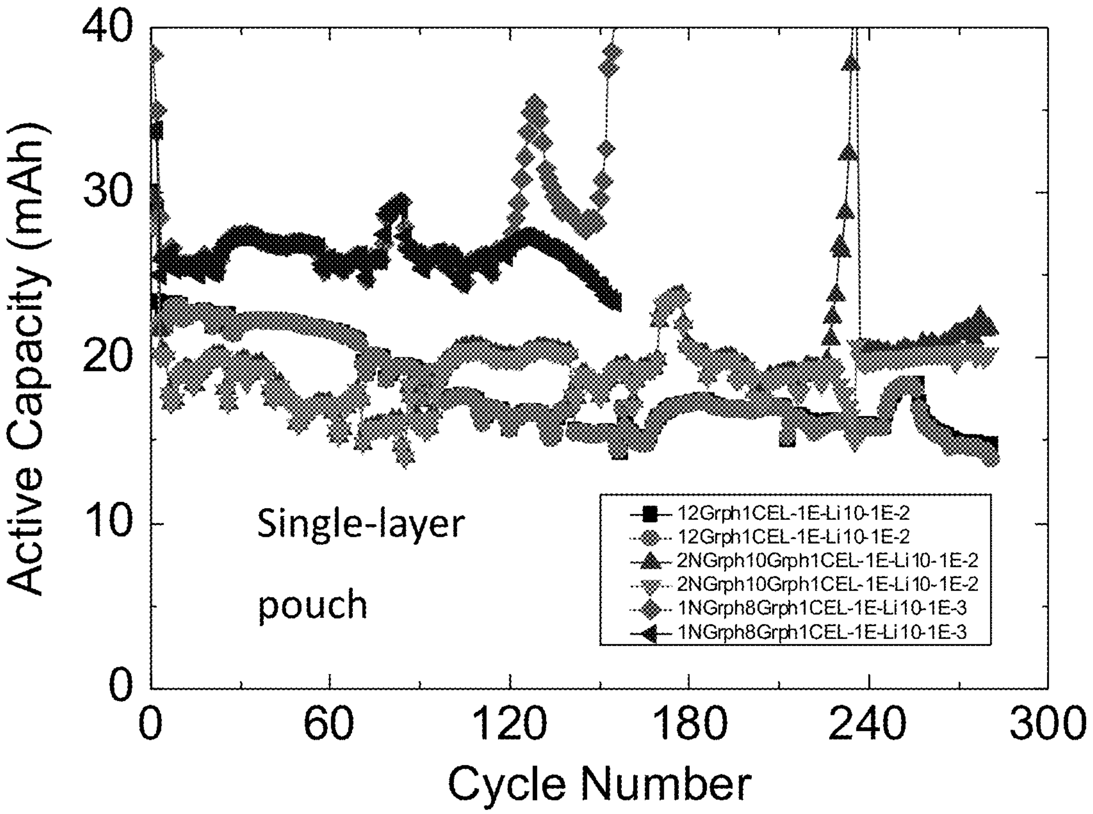

The resultant battery was tested for capacity retention and cycling stability (FIGS. 3A-3B) and the results in coin cells and single-layer pouch cells depicted in FIGS. 4A-4B.

All the systems with graphene scaffolds can deliver a high electrochemical stability for more than 350 cycles and even to 700 cycles in coin cells at 1C/1C, achieving distinct incremental electrochemical stability than bare LMA.

The systems with N-doped graphene scaffolds can deliver a high electrochemical stability for more than 200 cycles in single-layer pouch cells at 1C/1C.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit, and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A self-assembled freestanding graphene membrane or graphene layer comprising:
- industrial-grade pure graphene having a particle size from approximately 1 to approximately 10 microns; and
- cellulose nanofibers having a nanofiber size from approximately 1-9 microns;
- the self-assembled freestanding graphene membrane or graphene layer having an electrical conductivity of between approximately 5.8 and 7.2 S/cm and a thermal conductivity of between approximately 2000 and 3000 W $m^{-1}$ $K^{-1}$;
- the freestanding graphene membrane or graphene layer formed from an aqueous dispersion of the graphene and the cellulose nanofibers in a mass ratio of graphene to cellulose nanofibers of 20:1 to 10:1 deposited on a substrate followed by self-assembly and drying.

2. The self-assembled freestanding graphene membrane or graphene layer of claim 1, further comprising a dopant including one or more of oxygen, nitrogen, sulfur, nickel, gold, silver, zinc, copper, magnesium, and boron.

3. The self-assembled freestanding graphene membrane or graphene layer of claim 2, wherein the dopant is added in the form of a doped graphene particle to the aqueous dispersion.

4. A lithium metal battery anode comprising the self-assembled freestanding graphene membrane or graphene layer of claim 1 with an electroplated layer of lithium having a capacity of 4 mAh $cm^{-2}$ to 10 mAh $cm^{-2}$ formed thereon.

5. A battery including the lithium metal battery anode of claim 4.

6. The battery of claim 5, where the battery is a lithium pouch battery.

7. A method of forming the self-assembled freestanding graphene-cellulose nanofiber membrane or layer of claim 1, comprising:
- forming an aqueous dispersion of graphene particles having a particle size of approximately 1 micron to approximately 10 microns with cellulose nanofibers having a nanofiber length of approximately 1 to approximately 9 microns in a mass ratio of graphene particles and the cellulose nanofibers of 20:1 to 10:1;
- mixing the aqueous dispersion;
- depositing the dispersion on a substrate;
- drying the dispersion to form the self-assembled freestanding graphene-cellulose nanofiber membrane or layer.

8. The method of claim 7, further comprising adding a dopant including one or more of oxygen, nitrogen, sulfur, nickel, gold, silver, zinc, copper, magnesium, and boron to the aqueous dispersion.

9. The method of claim 8, wherein the dopant is added in the form of a doped graphene particle to the aqueous dispersion.

10. The method of claim 7, wherein the depositing is by dispersion casting or doctor blade coating.

11. The method of claim 7, further comprising rolling following drying.

12. The method of claim 7, further comprising low temperature thermal treatment at a temperature of approximately 50-70° C. for a period of approximately 6 hours to 24 hours.

13. The method of claim 7, further comprising electroplating a lithium metal layer on the self-assembled freestanding graphene-cellulose nanofiber membrane or layer.

* * * * *